(12) United States Patent
Wang et al.

(10) Patent No.: US 9,170,336 B2
(45) Date of Patent: Oct. 27, 2015

(54) ALL BAND GNSS RECEIVER

(71) Applicant: Aviacomm Inc., Santa Clara, CA (US)

(72) Inventors: Hans Wang, Mountain View, CA (US); Tao Li, Campbell, CA (US); Binglei Zhang, San Jose, CA (US); Shih Hsiung Mo, San Jose, CA (US)

(73) Assignee: AVIACOMM INC., Sunnyvale, CA (US)

( * ) Notice: Subject to any disclaimer, the term of this patent is extended or adjusted under 35 U.S.C. 154(b) by 476 days.

(21) Appl. No.: 13/645,249

(22) Filed: Oct. 4, 2012

(65) Prior Publication Data

US 2014/0098839 A1 Apr. 10, 2014

(51) Int. Cl.
*G01S 19/33* (2010.01)
*G01S 19/35* (2010.01)

(52) U.S. Cl.
CPC . *G01S 19/33* (2013.01); *G01S 19/35* (2013.01)

(58) Field of Classification Search
CPC .................................. G01S 19/33; G01S 19/36
USPC ........................................ 342/357.73, 357.76
See application file for complete search history.

(56) References Cited

U.S. PATENT DOCUMENTS

| 8,144,054 | B2 * | 3/2012 | Geswender et al. ...... 342/357.59 |
| 2009/0106535 | A1 * | 4/2009 | Chen et al. ..................... 712/220 |
| 2010/0302100 | A1 * | 12/2010 | Yang et al. ............... 342/357.73 |

* cited by examiner

*Primary Examiner* — Harry Liu
(74) *Attorney, Agent, or Firm* — Shun Yao; Park, Vaughan, Fleming & Dowler LLP

(57) ABSTRACT

One embodiment of the present invention provides a signal-recording system. During operation, the system receives a plurality of radio frequency (RF) signals, separates the RF signals to obtain a first group of RF signals in a first RF band and a second group of RF signals in a second RF band, and simultaneously down-converts the first group of RF signals to a first group of low intermediate-frequency (low-IF) signals in a first IF band and the second group of RF signals to a second group of low-IF signals in a second IF band. The system further converts the first group of low-IF signals and the second group of low-IF signals to the digital domain, and simultaneously processes all of the converted low-IF signals.

15 Claims, 5 Drawing Sheets

ALL BAND GNSS RECEIVER

BACKGROUND

1. Field

The present disclosure relates generally to a satellite-signal receiving system. More specifically, the present disclosure relates to a system capable of receiving signals from all four global navigation satellite systems (GNSSs).

2. Related Art

In recent years, the proliferation of portable satellite-signal-receiving devices has resulted in an expansion of the usage of satellite navigation from the military domain to various aspects of civilian life. For example, nowadays most smartphones are equipped with built-in Global Positioning System (GPS) receivers that enable real-time position tracking and direction guiding.

Currently, there are four global navigation satellite systems (GNSSs) that can provide global coverage, including two fully operational systems (the United States' NAVSTAR GPS and the Russian Globalnaya Navigatsionnaya Sputnikovaya Sistema (GLONASS)), and two partially developed systems (the Chinese Compass navigation system and the European Union's Galileo positioning system).

SUMMARY

One embodiment of the present invention provides a signal-recording system. During operation, the system receives a plurality of radio frequency (RF) signals, separates the RF signals to obtain a first group of RF signals in a first RF band and a second group of RF signals in a second RF band, and simultaneously down-converts the first group of RF signals to a first group of low intermediate-frequency (low-IF) signals in a first IF band and the second group of RF signals to a second group of low-IF signals in a second IF band. The system further converts the first group of low-IF signals and the second group of low-IF signals to the digital domain, and simultaneously processes all of the converted low-IF signals.

In a variation on this embodiment, simultaneously processing all of the converted low-IF signals includes selecting a respective low-IF signal based on an IF carrier frequency, and processing the selected low-IF signal.

In a variation on this embodiment, simultaneously processing all of the converted low-IF signals involves a digital signal processor (DSP) that includes multiple processing units.

In a variation on this embodiment, a frequency spacing between the first RF band and the second RF band is greater than a frequency spacing between the first IF band and the second IF band.

In a further variation, a frequency spacing between the first RF band and the second RF band is at least 200 MHz.

In a variation on this embodiment, the RF signals include satellite signals from multiple global navigation satellite systems.

In a further variation, the system generates a combined positioning output based on the satellite signals from the multiple global navigation satellite systems.

In a further variation, the multiple global navigation satellite systems include: Global Positioning System (GPS), Globalnaya Navigatsionnaya Sputnikovaya Sistema (GLONASS), Compass navigation system, and Galileo positioning system.

In a variation on this embodiment, a bandwidth of the received RF signals exceeds 400 MHz.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a dual-band satellite-signal receiver that is capable of receiving satellite signals that occupy two frequency bands. The dual-band satellite-signal receiver includes a wideband antenna; two sets of filter/down-converters, each for one frequency band; an analog-to-digital converter (ADC); and a multi-baseband digital signal processor (DSP). More specifically, each set of filter/down-converters includes a band-pass filter (BPF), one or more low-noise amplifiers (LNAs), and a mixer that down-converts the satellite signal from an RF band to a low intermediate-frequency (IF). After down-conversion, satellite signals from the two RF bands are combined and AD-converted before being sent to the multi-baseband DSP, which processes all four GNSS signals.

GNSS Receiver

The popularity of portable satellite-signal receivers, which are often built into various types of smartphone, has driven the development of many location-sensitive applications, such as navigation, locating the nearest point of interest, location-aware social media applications, exercising, etc. Most available satellite-signal receivers are GPS receivers, meaning that they receive signals from the United States' GPS satellites. Since it became available globally in the mid-1990's, GPS has been the world's most utilized satellite navigation system. However, there are other global navigation satellite systems, including GLONASS, Compass, and Galileo, that can also provide positioning information. It is desirable to take advantage of all available global positioning systems by receiving signals from all systems simultaneously in order to achieve the best positioning outcome, including improved coverage in urban canyons and a faster response time. Currently available systems that can receive signals from multiple GNSS systems often rely on multiple separate receivers, each for receiving signals from one system. Using separate receivers not only increases manufacturing costs and overall system complexity, but can also result in increased power consumption and decreased system reliability. To solve this problem, embodiments of the present invention provide a satellite-signal-receiving system that uses a single receiver to obtain signals from all GNSS systems.

Figure 1:
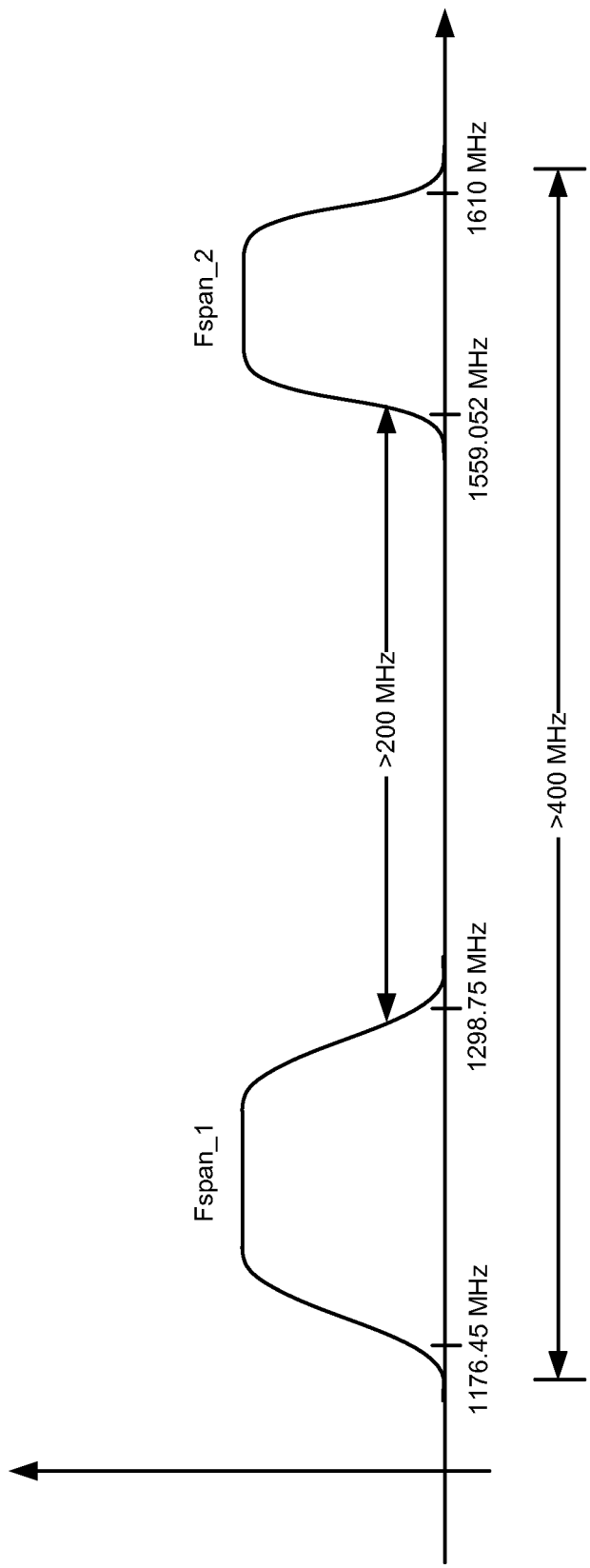
FIG. 1 presents a diagram illustrating the two RF frequency bands occupied by the GNSS signals.

All satellites in the GPS system broadcast at the same two frequencies, 1575.42 MHz (so-called L1 signal) and 1227.60 MHz (so-called L2 signal). GLONASS satellites broadcast at either 1602 MHz or 1246 MHz. Compass satellites are designed to broadcast at 1561.098 MHz, 1589.742 MHz, 1207.14 MHz, and 1268.52 MHz. Galileo, on the other hand, occupies the frequency bands between 1164-1215 MHz, 1260-1300 MHz, and 1559-1592 MHz. In summary, satellite signals from all GNSS systems occupy two frequency bands, with one extending from 1176.45 MHz to 1298.75 MHz (named FSpan_1 in this disclosure), and the other one extending from 1559.052 MHz to 1610 MHz (named FSpan_2 in this disclosure). FIG. 1 presents a diagram illustrating the two RF frequency bands occupied by the GNSS signals. Note that these two bands occupy a frequency range that is greater than 400 MHz with the spacing between the two bands being greater than 200 MHz.

In order to receive all GNSS signals, a receiver may need to receive signals from both the FSpan_1 band and the FSpan_2 band. One straightforward solution is to use a wideband receiver capable of receiving signals ranging from the lower edge of the FSpan_1 band to the upper edge of the FSpan_2 band. However, this means that any signal in the spacing between the two bands is also received, which can cause interference to the received satellite signal. Moreover, such a solution requires all components in the receiver to have a bandwidth greater than 400 MHz, which can be a challenge to RF designers.

Figure 2:
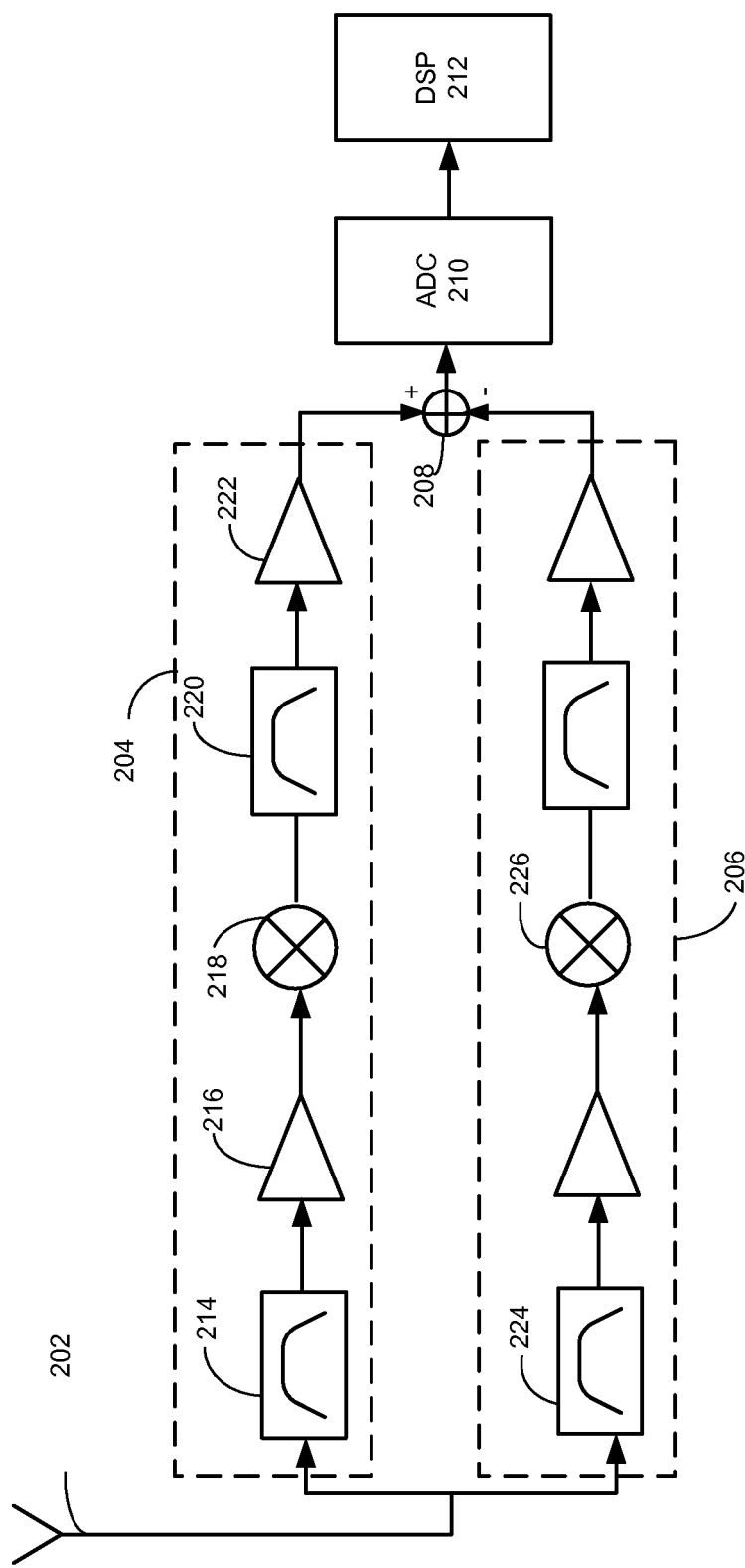
FIG. 2 presents a diagram illustrating the architecture of an exemplary dual-band satellite-signal receiver, in accordance with an embodiment of the present invention.

FIG. 2 presents a diagram illustrating the architecture of an exemplary dual-band satellite-signal receiver, in accordance with an embodiment of the present invention. In FIG. 2, dual-band satellite-signal receiver 200 includes a wideband antenna 202, an FSpan_1 receiving path 204, an FSpan_2 receiving path 206, a combiner 208, an analog-to-digital converter (ADC) 210, and a multi-baseband digital-signal processor (DSP) 212.

During operation, wideband antenna 202 receives satellite signals from all four GNSS systems. The received signals are sent to both receiving paths, each of which in turn filters, amplifies, and down-converts the received RF satellite signals from a corresponding frequency band. More specifically, FSpan_1 receiving path 204 filters, amplifies, and down-converts signals in the FSpan_1 band to one intermediate frequency (IF); whereas FSpan_2 receiving path 206 filters, amplifies, and down-converts signals in the FSpan_2 band to a different intermediate frequency (IF). Note that these two IFs are carefully selected to prevent any overlap in the frequency domain between signals in the two original frequency bands.

FSpan_1 receiving path 204 includes a band-pass filter (BPF) 214, an RF low-noise amplifier (LNA) 216, a mixer 218, a BPF 220, and an IF amplifier 222. RF satellite signals received by antenna 202 are first filtered by BPF 214, which selects signals in the FSpan_1 RF band while rejecting other out-of-band signals, such as signals from the FSpan_2 band. The filtered signals are then amplified by RF LNA 216 before being down-converted to low IF signals by mixer 218. The IF is carefully selected to make sure that the down-converted FSpan_1 band stays away from DC to prevent interference, such as flicker noise. Note that, for the purpose of simplicity, local oscillators, which provide sinusoid waves to be mixed with the RF signals, are not shown in FIG. 2. BPF 220 filters out the sum-frequency signals as well as other undesirable signals, leaving only the desired low IF signal. IF amplifier 222 amplifies the IF signals. In one embodiment, IF amplifier 222 also implements automatic gain control (AGC) to achieve the optimal amplification effect.

Figure 3:
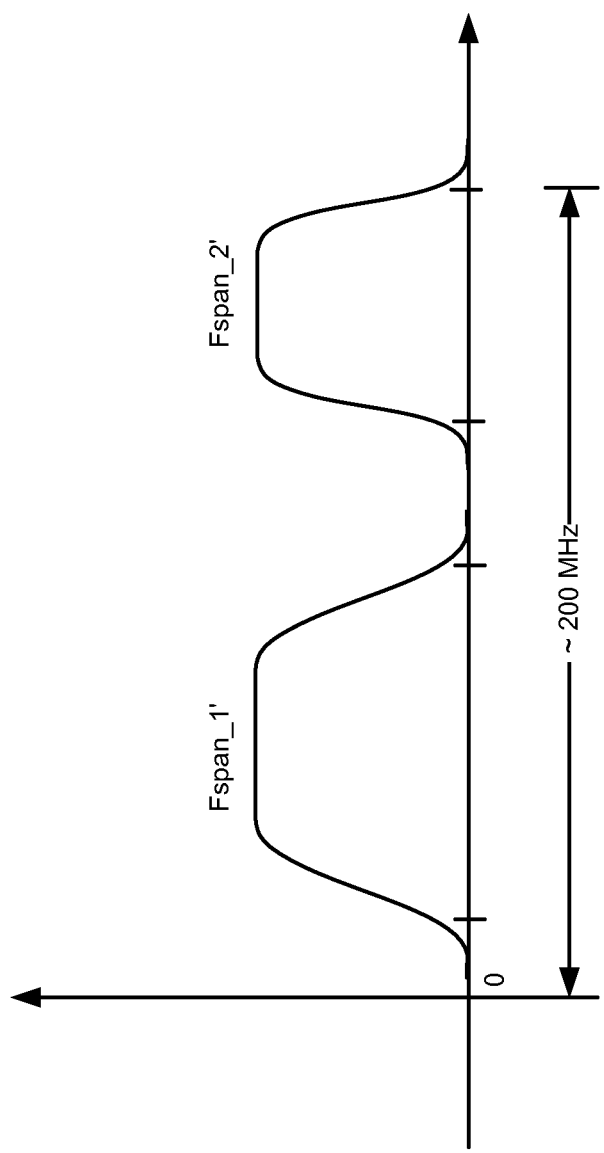
FIG. 3 presents a diagram illustrating the two down-converted intermediate frequency (IF) bands, in accordance with an embodiment of the present invention.

Components within FSpan_2 receiving path 206 are similar to the ones in FSpan_1 receiving path 204, except that filter 224 selects signals in the FSpan_2 band, and mixer 226 down-converts the FSpan_2 band signals to a different IF frequency. Note that the IF frequency in FSpan_2 receiving path 206 is carefully selected to ensure that there is no overlap between the two IF bands. Signals from the two IF bands are combined by combiner 208. In one embodiment, combiner 208 is a simple adder. FIG. 3 presents a diagram illustrating the two down-converted IF bands, in accordance with an embodiment of the present invention.

As shown in FIG. 3, the FSpan_1' band is the down-converted IF band for the original FSpan_1 band, and the FSpan_2' band is the down-converted IF band for the original FSpan_2 band. Compared with the spectrum shown in FIG. 1, signals in the IF bands have a much lower carrier frequency, and the spacing between the two IF bands is much smaller compared with the spacing between the two original RF bands. In one embodiment, the bandwidth of all IF signals is around 200 MHz, which is much smaller than the 400 MHz bandwidth shown in FIG. 1.

The combined signals from the two IF bands are converted to the digital domain by ADC 210. In one embodiment, ADC 210 is a 3-bit ADC with a sampling rate of 400 MHz. It is also possible to use a lower resolution ADC, such as a 1-bit ADC or a 2-bit ADC. However, the 3-bit ADC enhances system reliability. Note that the sampling rate of ADC 210 is determined by the bandwidth of the IF signals. In the example shown in FIG. 3, the IF signals have a bandwidth of around 200 MHz, meaning that a sampling rate of at least 400 MHz is needed.

Figure 4:
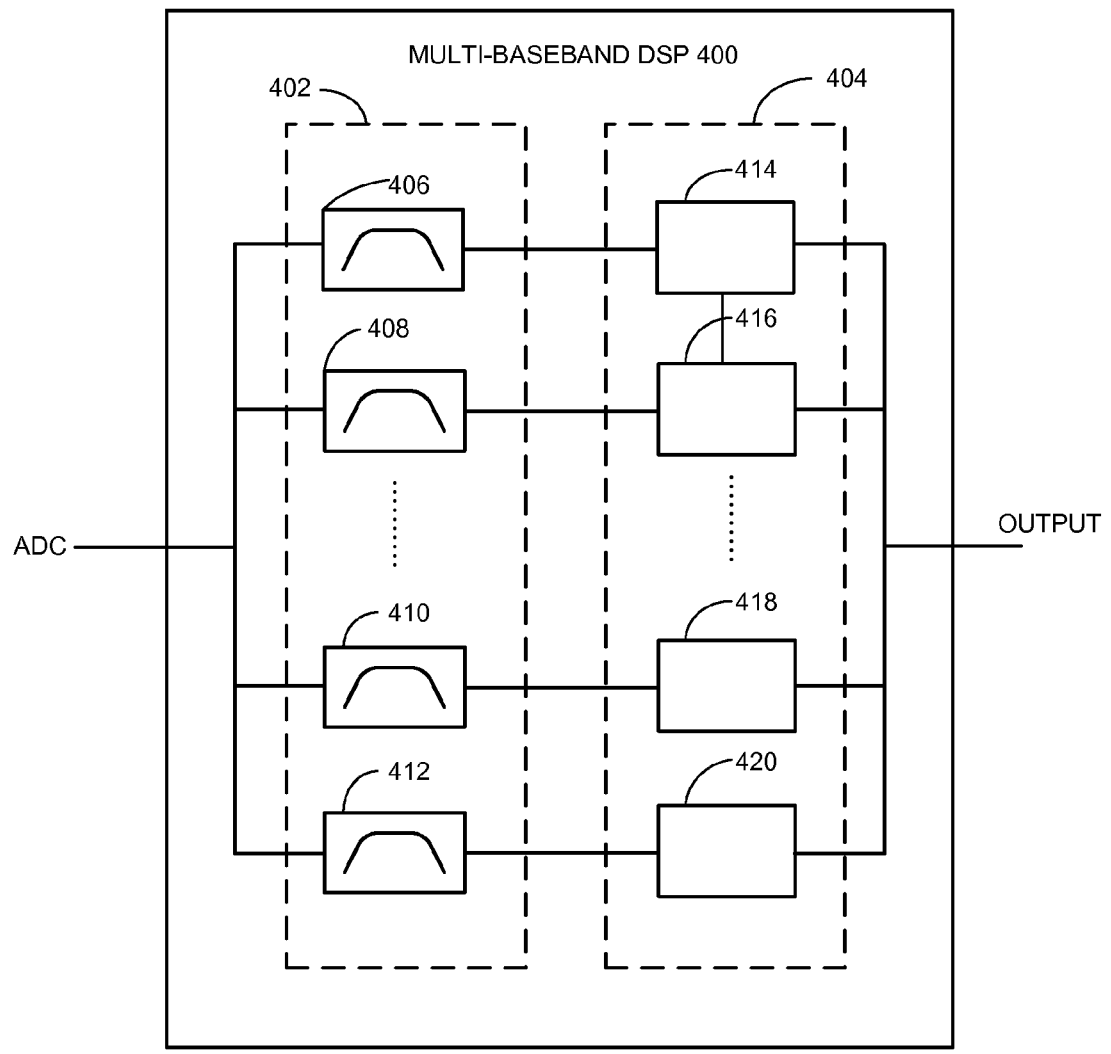
FIG. 4 presents a diagram illustrating the architecture of an exemplary multi-band digital signal processor (DSP), in accordance with an embodiment of the present invention.

The digitized signals, which include signals from all four GNSS systems, are then sent to multi-baseband DSP 212 for processing. Multi-baseband DSP 212 is capable of processing multiple channels of signals, or signals on multiple carrier frequencies, simultaneously. FIG. 4 presents a diagram illustrating the architecture of an exemplary multi-band DSP, in accordance with an embodiment of the present invention.

In FIG. 4, multi-baseband DSP 400 includes a filter bank 402 and a processor bank 404. Filter bank 402 includes a number of digital BPFs, such as BPFs 406, 408, 410, and 412. Processor bank 404 includes a number of processors, such as processors 414, 416, 418, and 420. During operation, digital BPFs 406-412 each receives digitized IF signals from the ADC and selects signals at a corresponding channel. For example, the center frequency of BPF 406 is tuned to GPS L1 frequency (1575.42 MHz) to select GPS L1 signals, whereas the center frequency of BPF 408 can be tuned to 1602 MHz to select GLONASS signals. The filtered outputs are then sent to the processors for further processing, such as digital down-converting, decoding, and positioning calculation. In one embodiment, the processors can cooperate with each other to generate an output based on signals from all four satellite systems.

Figure 5:
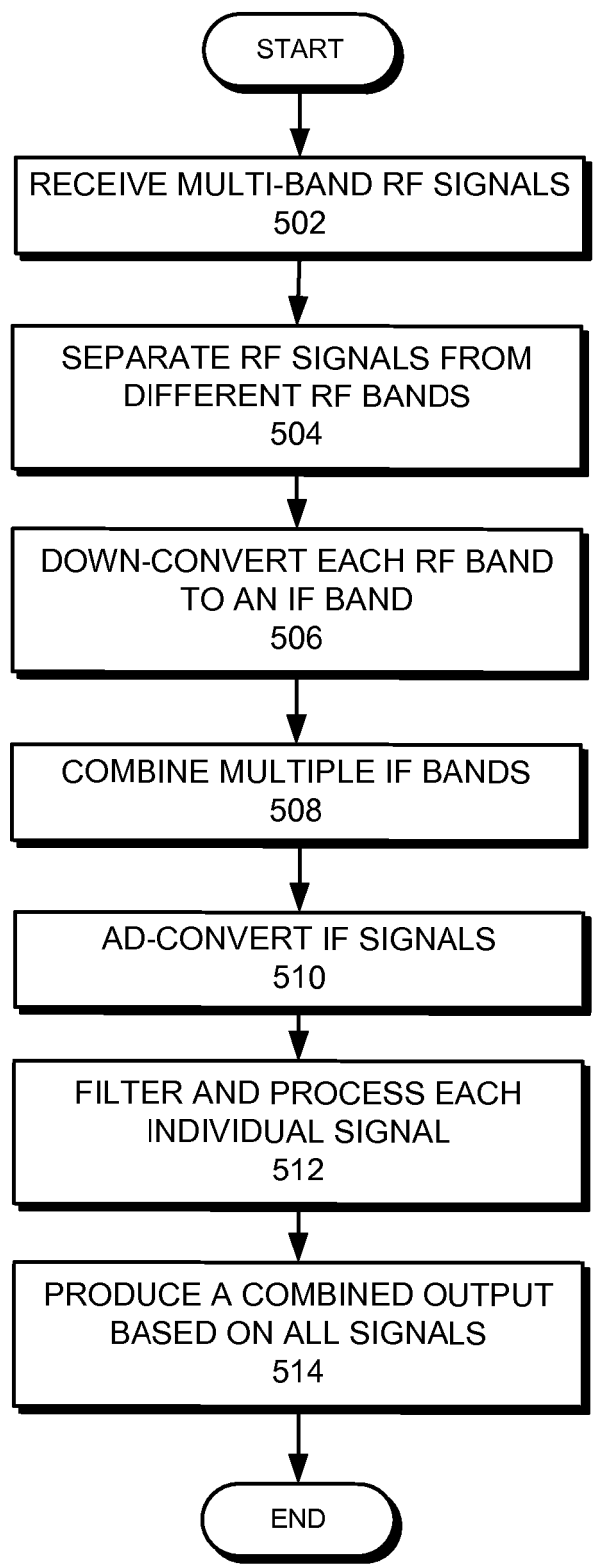
FIG. 5 presents a diagram illustrating an exemplary process of receiving multi-band RF signals, in accordance with an embodiment of the present invention.

FIG. 5 presents a diagram illustrating an exemplary process of receiving multi-band RF signals, in accordance with an embodiment of the present invention. During operation, multi-band RF signals are received by a wideband antenna (operation 502). In one embodiment, the RF signals occupy two separate RF bands with a frequency spacing in between. In a further embodiment, the frequency spacing is at least 200 MHz. The received RF signals are then separated spatially based on which frequency band they belong to (operation 504). In one embodiment, spatially separated BPFs having different passing bands are used to achieve this goal.

Subsequently, each band of RF signals is down-converted to corresponding IF signals (operation 506). The IF frequencies are carefully selected to ensure that there is frequency overlap among the IF bands. In one embodiment, the IF frequencies are selected in a way that the spacing between two adjacent IF bands is kept at a minimum. After down-conversion, all IF bands are combined (operation 508), and the combined IF signals are converted to the digital domain by a single ADC running at an appropriate sampling rate (operation 510). The digital signals are sent to a multi-baseband DSP, which filters (using a digital filter) each individual signal based on its carrier frequency, and then processes each individual signal (operation 512). Note that here the carrier frequency is the IF carrier, not the original RF carrier, and there is a one-to-one correspondence between the RF carrier frequencies and the IF carrier frequencies. In one embodiment, digital-conversion can be performed to convert each IF signal to baseband. The system further produces a combined output based on all signals (operation 514). For example, if the multi-band signals are satellite signals from all four GNSS systems, the combined output can be a geographical location calculated based on information collected from all GNSS systems.

In general, compared with traditional schemes that rely on multiple receivers to receive satellite signals from the different GNSS systems, in embodiments of the present invention, signals from the different GNSS systems are received by a single receiver that includes two receiving paths, each for a particular frequency band. Note that each frequency band includes signals from different GNSS systems, each on a different carrier frequency. Moreover, the two receiving paths share a number of common components, such as the antenna, the ADC, and the DSP, thus significantly decreasing power consumption and system complexity.

Note that the architecture shown in FIGS. 2 and 4 is merely exemplary and should not limit the scope of this disclosure. For example, in FIG. 2, a frequency mixer is used to down-convert the RF signals to IF. In practice, other down-conversion schemes, such as quadrature down-conversion, are also possible. In addition, FIG. 4 illustrates a processor bank that includes multiple processors for processing the digitized satellite signals. In practice, the number of processors can vary. In some embodiments, a single powerful processor is used to process signals from all GNSS systems. In some embodiments, a dedicated processor is allocated for signals from a particular satellite system.

Also note that this disclosure uses satellite signals as an example. In practice, the single receiver disclosed by embodiments of the present invention can also receive other types of multi-band signal, including but not limited to: cable or satellite TV signals; or other radio signals, such as broadcast radio, WiFi, and mobile phone signals. For example, broadcast radio may include multiple frequency bands: the short-wave band, the AM band, and the FM band. The single receiver disclosed by embodiments of the present invention can be configured to simultaneously receive signals from all three radio bands, given that three receiving paths may be needed rather than two.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   receiving a plurality of radio frequency (RF) signals;
   separating the RF signals to obtain a first group of RF signals in a first RF band and a second group of RF signals in a second RF band;
   simultaneously down-converting the first group of RF signals to a first group of low intermediate-frequency (low-IF) signals in a first IF band and the second group of RF signals to a second group of low-IF signals in a second IF band;
   combining the first group of low-IF signals and the second group of low-IF signals to produced a combined low-IF signal;
   converting, using an analog-to-digital converter (ADC) module, the combined low-IF signal to digital domain to obtain a combined digital signal; and
   processing the combined digital signal, which involves applying digital filters to the combined digital signal to produce a separate output signal from each digital filter's output.

2. The method of claim 1, further comprising processing the combined digital signal using a digital signal processor (DSP) that includes multiple processing units.

3. The method of claim 1, wherein a frequency spacing between the first RF band and the second RF band is greater than a frequency spacing between the first IF band and the second IF band.

4. The method of claim 3, wherein a frequency spacing between the first RF band and the second RF band is at least 200 MHz.

5. The method of claim 1, wherein the RF signals include satellite signals from multiple global navigation satellite systems.

6. The method of claim 5, further comprising generating a combined positioning output based on the satellite signals from the multiple global navigation satellite systems.

7. The method of claim 5, wherein the multiple global navigation satellite systems include:
   Global Positioning System (GPS);
   Globalnaya Navigatsionnaya Sputnikovaya Sistema (GLONASS);
   Compass navigation system; and
   Galileo positioning system.

8. The method of claim 1, wherein a bandwidth of the received RF signals exceeds 400 MHz.

9. A system, comprising:
   a wideband antenna configured to receive a plurality of radio frequency (RF) signals which include a first group of RF signals in a first RF band and a second group of RF signals in a second RF band;
   two band-pass filters (BFPs), each configured to select a corresponding group of RF signals;
   two down-converters, each for a selected group of RF signals, wherein the down-converters are configured to simultaneously down-convert the first group of RF signals to a first group of low intermediate-frequency (low-IF) signals in a first IF band and the second group of RF signals to a second group of low-IF signals in a second IF band;

a combiner configured to combine the first group of low-IF signals and the second group of low-IF signals to produce a combined low-IF signal;

an analog-to-digital converter (ADC) module configured to convert the combined low-IF signal to digital domain to obtain a combined digital signal; and a digital signal processor (DSP) configured to process the combined digital signal, wherein the DSP includes a plurality of digital filters and a plurality of processing units, wherein a respective processing unit is configured to process an output of a corresponding digital filter.

10. The system of claim 9, wherein a frequency spacing between the first RF band and the second RF band is greater than a frequency spacing between the first IF band and the second IF band.

11. The system of claim 10, wherein a frequency spacing between the first RF band and the second RF band is at least 200 MHz.

12. The system of claim 9, wherein the RF signals include satellite signals from multiple global navigation satellite systems.

13. The system of claim 12, further comprising an output generation mechanism configured to generate a combined positioning output based on the satellite signals from the multiple global navigation satellite systems.

14. The system of claim 12, wherein the multiple global navigation satellite systems include:
 Global Positioning System (GPS);
 Globalnaya Navigatsionnaya Sputnikovaya Sistema (GLONASS);
 Compass navigation system; and
 Galileo positioning system.

15. The system of claim 9, wherein a bandwidth of the received RF signals exceeds 400 MHz.

* * * * *